United States Patent [19]

Karlsson

[11] Patent Number: 4,547,989
[45] Date of Patent: Oct. 22, 1985

[54] CATCHING HOOK

[76] Inventor: Bengt Karlsson, Sjövägen 1, S-136 49 Handen, Sweden

[21] Appl. No.: 624,681

[22] PCT Filed: Oct. 24, 1983

[86] PCT No.: PCT/SE83/00361

§ 371 Date: Jun. 22, 1984

§ 102(e) Date: Jun. 22, 1984

[87] PCT Pub. No.: WO84/01488

PCT Pub. Date: Apr. 26, 1984

[30] Foreign Application Priority Data

Oct. 22, 1982 [SE] Sweden ............................. 8206007

[51] Int. Cl.⁴ .................................... A01K 97/14
[52] U.S. Cl. ................................ 43/5; 177/251
[58] Field of Search .............. 43/4, 1, 5, 6; 294/26, 294/19.3; 177/246, 251, 245

[56] References Cited

U.S. PATENT DOCUMENTS

| 274,202 | 3/1883 | King | 177/251 |
| 1,126,398 | 1/1915 | Cleophas | 177/251 |
| 1,686,889 | 10/1928 | Woods | 294/26 |
| 2,570,538 | 10/1951 | Fincher | 177/245 |
| 3,803,742 | 4/1974 | Foster | 43/6 |
| 4,351,126 | 9/1982 | Simonson | 43/5 |

FOREIGN PATENT DOCUMENTS 181906 6/1922 United Kingdom ............... 43/5

Primary Examiner—Gene P. Crosby
Attorney, Agent, or Firm—Oblon, Fisher, Spivak, McClelland & Maier

[57] ABSTRACT

The invention relates to a catching hook having a straight portion (1) which in one end is provided with a hook (2) and another straight portion (3) which in the end opposite to the hook is provided with a handle (4). The portions are displaceable relative to one another between a catching position when they are extended at a maximum to a transportation position when they are pushed together. The hook (2) is rotatably connected to the end of the first straight portion (1), a locking device (6) being arranged in that end to prevent the rotation of the hook when used in its catching position, and after release permit rotation to a weighing position. The handle (4) is rotatably connected to a supporting device in the form of a sleeve (7) which is slidingly arranged on the corresponding straight portion, the handle being pivotably connected to the sleeve and after release from the end of the straight portion rotatable to a weighing position. A counterweight (12) is attachable to the end of the handle portion so that the catching hook can be used as a balance scale.

6 Claims, 3 Drawing Figures

U.S. Patent  Oct. 22, 1985  4,547,989
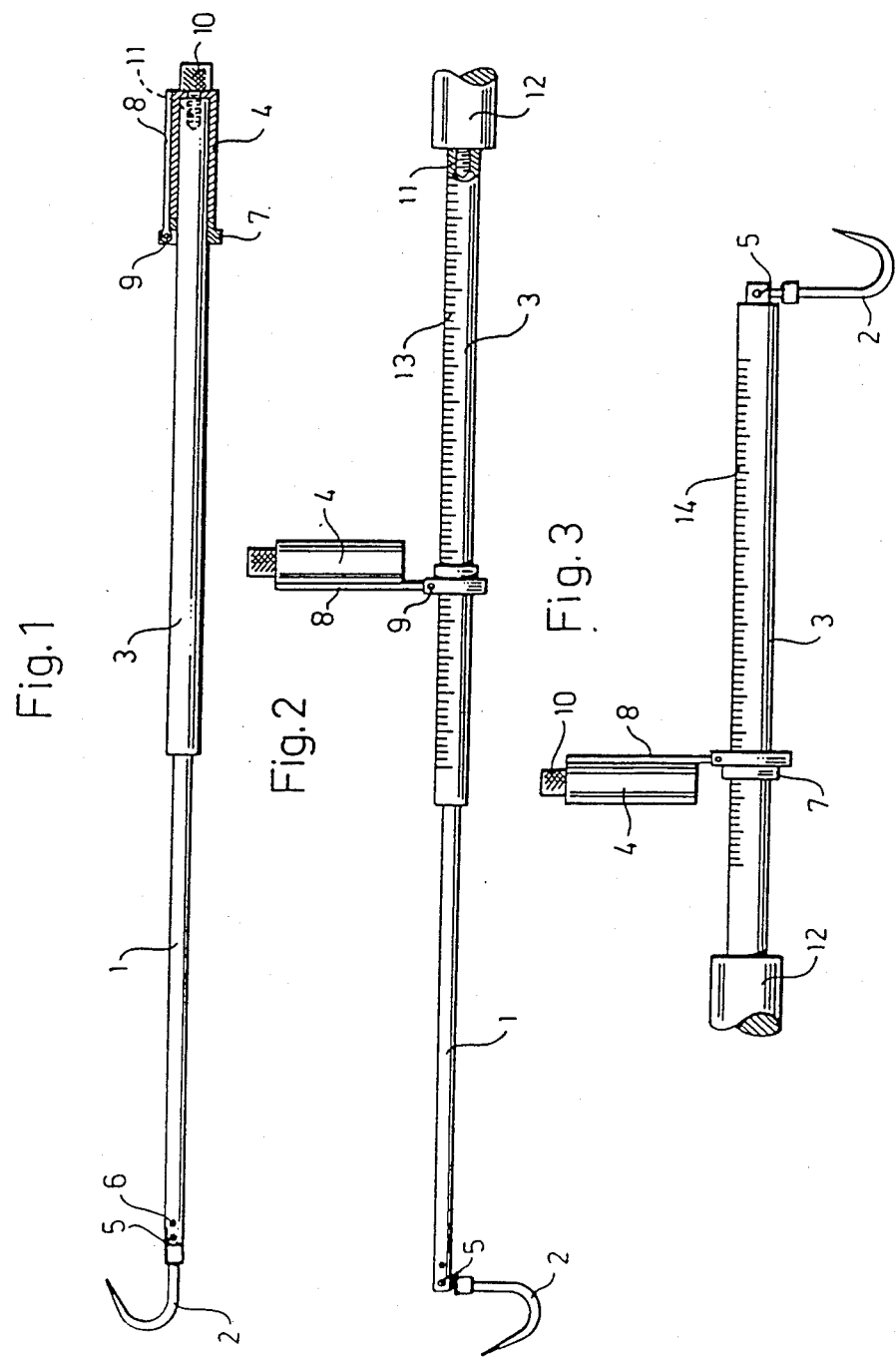

CATCHING HOOK

The present invention relates to a catching hook, comprising two straight portions which are arranged for displaceable movement relative to one another between a catching position when the portions are in extended relationship to a transport position when the straight portions are pushed together, one of said straight portions being in one end provided with a hook and the other straight portion being provided with a handle at the end opposite to the hook.

A catching hook of the kind mentioned above is a fishing tackle which is used as an assisting device to lift heavy catching out of the water, thereby preventing the tackle from being damaged and the fish from disappearing. Usually the two straight portions are telescopically displaceable relative to each other but this is of course no prerequisite for the invention.

The object of the present invention is to realize a catching hook which through an easy measure can be used as a balance scale.

This object is realized according to the invention substantially by the fact that the hook is rotatably connected with the end of the first straight portion and that locking means are arranged to prevent rotational movement of the hook when used in catching position, and after release of said locking means permit its rotation to a weighing position, and that the handle is rotatably connected to a supporting device which is slidingly displaceable on the corresponding straight portion, said handle being pivotably connected to said supporting device and after release from the end of the corresponding straight portion being swingable to a weighing position, and that a counterweight is attachable to the end of the handle portion, whereby the catching hook can be used as balance scale which is carried by means of the outwardly swung handle.

An embodiment of the invention will now be described more in detail with reference to the accompanying drawings in which FIG. 1 is a catching hook according to the invention in a catching position, FIG. 2 is the catching hook now used as balance scale for lighter weights, and FIG. 3 is the catching hook used as scale for heavier weights.

As appears from FIG. 1 a catching hook according to the invention comprises one straight portion 1 which in one end is provided with a hook 2 and another straight portion 3 which at its end opposite to the hook is provided with a handle 4. The two straight portions 1 and 3 comprise in the embodiment disclosed two telescoping tubes which are displaceable between a catching position when the tubes are extended at a maximum as shown in the Figure, to a transport position when the tubes are pushed together as appears from FIG. 3. The hook 2 is rotatably connected with the end of the first tube by means of a through shaft 5 and the hook can be blocked in catching position by means of a pin 6 which prevents rotation of the hook and which after release permits rotation to a weighing position as appears from FIGS. 2 and 3. The handle 4 is in a similar way rotatably connected to a supporting device in the form of a sleeve 7 which is slidingly displaceable on the corresponding tube portion 3. The upper side of the handle is reinforced by means of a ledge 8 which in one end is attached to a shaft 9 in the sleeve 7. At the end of the handle there is an engagement member in the form of a locking screw 10 which by means of threads or a bajonet clutch fits in a corresponding recess 11 in the end of the handle portion. In this embodiment the handle 4 is made in the form of tube and has an inner diameter which fits the outer diameter of the handle portion 3 whereby the handle can be telescopically displaced over the handle portion and can be attached to it by means of the locking screw 10.

As appears from FIG. 2 the catching hook according to the invention can easily be transformed into a balance scale by releasing the pin 6 in the end of the hook portion whereby the hook can be pivoted around the shaft 5 to a weighing position. The handle is released in the way described above by releasing the locking screw 10 from the recess 11 and the handle can then easily be pulled out from the handle portion 3 and swung out to the weighing position shown on the Figure. Then a counterweight 12 is attached to the end of the handle portion preferably in the same recess 11 as the screw 10. In the position shown on the Figure when the two tubeformed portions are pulled out of one another at a maximum the balance scale is ready for weighing of relatively light catching and the first scale graduation 13 on the handle portion 3 is consequently adapted for weighing in this position.

The catching hook according to the invention also permits weighing of heavier catching whereby the two tubeformed portions 1 and 3 are pushed together to a position which is shown on FIG. 3. The tubeformed portion 3 with the greater diameter is thus provided with a further scale graduation 14 which is adapted for weighing in this specific position.

Weighing of catching is carried out in a conventional way by displacing the sleeve 7 to a position where balance occurs whereby the position of the sleeve on the tubeformed portion 3 is read out.

I claim:

1. Catching hook comprising two straight portions which are arranged for displaceable movement relative to one another between a catching position when the portions are in extended relationship, to a transport position when the straight portions are pushed together, one of said straight portions being in one end provided with a hook and the other straight portion being provided with a handle at the end opposite to the hook, characterized in that the hook is rotatably connected with the end of the first straight portion, and that locking means are arranged to prevent rotational movement of the hook when used in catching position, and after release of said locking means permit its rotation to a weighing position, and that the handle is rotatably connected to a supporting device which is slidingly displaceable on a corresponding one of said straight portions, said handle being pivotably connected to said supporting device and after release from the end of the corresponding straight portion, being swingable to a weighing position, and that a counterweight is attachable to the end of the handle portion, whereby the catching hook can be used as balance scale which is carried by means of the outwardly swung handle.

2. A hook according to claim 1, characterized in that the hook is rotatably connected to a corresponding one of said straight portions by means of a through shaft and is non-rotatably secured to said portion by means of a through pin.

3. A hook according to claim 1, characterized in that the supporting device comprises a sleeve which is slidingly arranged on the handle portion, the peripheral portion of said sleeve being provided with a pivot axle for the rotational movement of said handle.

4. A hook according to claim 3, characterized in that the handle is telescopingly displaceable over the end portion of a corresponding one of said straight portions and is attachable to the end of the latter by means of an engagement member cooperating with a recess in the end surface.

5. A hook according to claim 4, characterized in that the counterweight is attachable in the recess in the end surface of the handle portion.

6. A hook according to any of the preceding claims, characterized in that the handle portion is provided with two graduated scales, one of which is intended for weighing when the two portions are extended to catching position, whereas the second is intended for weighing when the two portions are pushed together to transport position.

* * * * *